April 12, 1949.
S. L. SHIVE
2,466,746
MEANS FOR MEASURING RESISTANCE
AT HIGH VOLTAGE
Filed Oct. 16, 1945
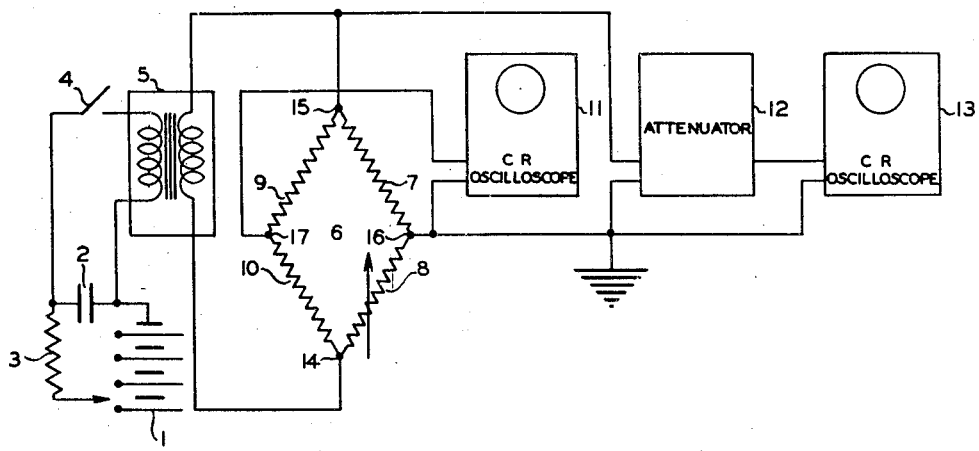
INVENTOR
SCOTT L. SHIVE
BY
*William D. Hall*
ATTORNEY Patented Apr. 12, 1949

2,466,746

UNITED STATES PATENT OFFICE 2,466,746

MEANS FOR MEASURING RESISTANCE AT HIGH VOLTAGE

Scott L. Shive, Bloomfield, N. J., assignor to the United States of America as represented by the Secretary of War Application October 16, 1945, Serial No. 622,650

2 Claims. (Cl. 175—183)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to means for measuring resistances at high voltage.

It is well known in the art that pure metals and their alloys have zero voltage coefficient of resistance, but that resistors formed of other substances may vary in resistance with the applied voltage. In many instances the ordinary methods for measuring the resistance of non-metallic conductors at high voltage are not applicable because of the great power that may be required, the complicating effects of heating, and the alteration or destruction of the sample under test.

It is an object of my invention to provide means for measuring resistances under high voltage which avoids the complications of high power, temperature changes and damage to the resistor measured.

It is another object of my invention to provide means for measuring the resistance of resistors under impulse voltages.

In describing the features of my invention reference will be made to the attached single drawing, which discloses a circuit diagram of resistance measuring apparatus embodying my invention. Therein is disclosed a variable direct voltage supply 1 having a range up to 1000 volts. This supply is connected to a 4 microfarad capacitor 2 through a current limiting resistor 3. In parallel across capacitor 2 is placed in series with a key 4 the primary of a 3 kva. 60 cycle 110–3000 volt transformer 5. The secondary is connected across the power terminals 14, 15 of a Wheatstone bridge 6. In one arm of bridge 6 is placed the sample 7 whose resistance is to be measured. The adjacent series arm is formed by a wire-wound non-inductive decade resistance box 8. The other two arms 9, 10 are wire-wound non-inductive resistors. Arm 9 has preferably a resistance one hundred times that of arm 10. The balance indicator terminals 16, 17 of the bridge 6 are connected to a cathode ray oscilloscope 11. In parallel across the sample 7 is placed a calibrated voltage attenuator 12, which feeds its output to a second calibrated cathode ray oscilloscope 13 serving as a voltmeter.

In the operation of my apparatus the decade box 8 is first set to balance the sample 7 approximately according to the low voltage value of the resistance of the sample, which has been determined earlier by conventional measurement at low voltage.

Key 4 is then closed momentarily at intervals of about one second, thereby discharging capacitor 2 through transformer 5. The deflection of the spot in oscilloscope 13 caused thereby is observed. The maximum deflection of the spot read in volts multiplied by the setting of attenuator 12 gives the peak instantaneous voltage applied to sample 7. The variable voltage supply 1 is adjusted to then produce the desired voltage across the sample 7.

It will be seen that the discharge of capacitor 2 through the primary of transformer 5 is oscillatory but quite highly damped and does not release sufficient energy to heat the bridge elements seriously. Between each shorting of key 4 a sufficient interval is allowed to permit capacitor 2 to recharge and to dissipate any heat generated in the bridge 6 or transformer 5 by the preceding discharge. Current limiting resistor 3 limits current from voltage supply 1 during the discharge to an amount negligible compared with that flowing from capacitor 2. The effect of transformer 5 is to step up the voltage of the discharge, a maximum of 12,000 volts peak being obtained in the transformer output for a 1,000 volt supply.

The bridge is next balanced by manipulation of decade resistance box 8 and by observation of cathode ray oscilloscope 11 as a balance indicator. A suitable time sweep is used in oscilloscope 11 so that the pulse of discharge voltage across sample 7 appears therein as a sinusoidal wave pattern of high decrement. Successive patterns will appear at random places along the trace but this is not too confusing. If desired, it is within the scope of my invention to connect the timing sweep of oscilloscope 11 with key 4 in such manner that the timing of the sweep bears a fixed relation to the timing of the discharge of capacitor 2 and of the voltage pulse across sample 7. This would cause the discharge pattern to remain stationary in the trace.

For the case that sample 7 has no voltage coefficient of resistance, null balance of the bridge 11 results in no voltage across the balance terminals 16, 17 and null balance is indicated when the trace of balance indicator oscilloscope 11 appears as a straight line throughout.

For the case that sample 7 has a considerable voltage coefficient of resistance; the discharge pattern on the trace of oscilloscope 11 cannot be smoothed out entirely. The voltage for which balance is desired is the peak of the pulse. In this case the peak of the pattern is observed when the bridge 6 is sufficiently unbalanced to make the peak prominent and the balance is then changed until the part of the pattern initially representing the peak is progressively reduced to a minimum. This minimum indicates the proper null balance of the bridge for the peak voltage. The setting of the bridge at this point is taken as the measure of the resistance of the sample for the observed peak voltage.

For the case that the sample has a definite but small voltage coefficient of resistance the bridge is adjusted to smooth out the discharge pattern to a minimum and this adjustment taken as null balance.

I realize that modifications of the resistance measuring device of my invention are possible without departing from the spirit of my invention and it is understood that the embodiments of my invention shall not be limited to the foregoing specification or the accompanying drawing but only as defined in the scope of the accompanying claims.

I claim:

1. In a resistance measuring device, a Wheatstone bridge comprising two resistances of known relative value, a resistance of unknown value at high voltage, and a calibrated variable resistance, connected to provide two input and two output terminals, means connected across the input terminals for producing a high voltage of very short duration, compared to the shortest interval at which it may be repeated, oscilloscope means for indicating the instantaneous unbalance voltage connected across said output terminals, and oscilloscope means connected across said unknown resistance for indicating the instantaneous applied voltage, whereby the resistance of said unknown at said applied voltage may be determined by adjusting the variable resistance to balance the bridge at said applied voltage.

2. In a device for measuring resistance at very high voltages as in claim 1, said means connected across the input terminals for producing a high voltage of very short duration comprising; the secondary of a transformer connected across the voltage input terminals, a condenser and switch in series with the primary of said transformer, and a slow charging circuit connected to said condenser, whereby operation of the switch at intervals comparable to the charging time of said condenser produces a high voltage across the input terminals of the bridge.

SCOTT L. SHIVE.

REFERENCES CITED

The following references are of record in the file of this patent:

UNITED STATES PATENTS

| Number | Name | Date |
| --- | --- | --- |
| 2,145,724 | Horsely | Jan. 31, 1939 |

OTHER REFERENCES

Hague, A. C. Bridge Methods, Pitman Publishing Corp., New York; 4th ed., 1938; pages 199–204, 547–548.

Electronics, Mar. 1945, page 125.

Bell Laboratories Record, Mar. 1945, pages 93–96.

Journal of Sci. Instrus., vol. 3; 1925, pages 87–89.